(12) United States Patent
Pust et al.

(10) Patent No.: US 6,813,118 B2
(45) Date of Patent: Nov. 2, 2004

(54) TRANSDUCING HEAD HAVING IMPROVED STUDS AND BOND PADS TO REDUCE THERMAL DEFORMATION

(75) Inventors: Ladislav Rudolf Pust, Savage, MN (US); Declan Macken, Prior Lake, MN (US); Tracy C. Baresh, Luck, WI (US); Ibro Tabakovic, Edina, MN (US); Venkateswara R. Inturi, Shakopee, MN (US)

(73) Assignee: Seagate Technology LLC, Scotts Valley, CA (US)

(*) Notice: Subject to any disclaimer, the term of this patent is extended or adjusted under 35 U.S.C. 154(b) by 168 days.

(21) Appl. No.: 10/277,878

(22) Filed: Oct. 22, 2002

(65) Prior Publication Data

US 2003/0128469 A1 Jul. 10, 2003

Related U.S. Application Data

(60) Provisional application No. 60/345,833, filed on Jan. 4, 2002.

(51) Int. Cl.$^7$ .......................... G11B 5/60; G11B 15/64; G11B 17/32; G11B 21/20; G11B 5/127
(52) U.S. Cl. ..................... 360/234.5; 360/110
(58) Field of Search ............. 360/234.5, 110, 360/234.3, 234, 230, 245.8

(56) References Cited

U.S. PATENT DOCUMENTS

| | | | |
|---|---|---|---|
| 4,853,810 A | 8/1989 | Pohl et al. ............... 360/234.7 |
| 5,283,942 A | 2/1994 | Chen et al. .............. 29/603.18 |
| 5,303,105 A | 4/1994 | Jorgenson ................ 360/294.3 |
| 5,377,058 A | 12/1994 | Good et al. .................... 360/75 |
| 5,452,164 A | 9/1995 | Cole et al. .................. 360/317 |
| 5,636,088 A | 6/1997 | Yamamoto et al. ...... 360/245.1 |
| 5,640,753 A | 6/1997 | Schultz et al. ........... 29/603.08 |
| 5,663,856 A | 9/1997 | Packard ..................... 360/122 |
| 5,710,683 A | 1/1998 | Sundaram ................... 360/126 |
| 5,771,570 A | 6/1998 | Chhabra et al. ......... 29/603.06 |
| 5,793,207 A | 8/1998 | Gill ............................. 324/252 |
| 5,896,243 A | 4/1999 | Koshikawa et al. ..... 360/234.7 |
| 5,896,244 A | 4/1999 | Watanabe et al. ........ 360/234.6 |
| 5,898,542 A | 4/1999 | Koshikawa et al. ..... 360/234.7 |
| 5,909,340 A | 6/1999 | Lairson et al. ........... 360/237.1 |
| 5,949,627 A | 9/1999 | Williams et al. ............ 360/126 |
| 5,991,113 A | 11/1999 | Meyer et al. ................. 360/75 |
| 6,074,566 A | 6/2000 | Hsiao et al. ................. 360/123 |
| 6,078,455 A | 6/2000 | Enarson et al. ............... 360/68 |
| 6,154,952 A | 12/2000 | Tangren ................... 29/603.04 |
| 6,212,040 B1 | 4/2001 | Hungerford ................. 360/221 |
| 6,252,741 B1 | 6/2001 | Ahn ........................ 360/235.1 |
| 6,366,428 B1 | 4/2002 | Yamanaka et al. .......... 360/126 |
| 6,441,994 B1 | 8/2002 | Wang et al. ................. 360/123 |
| 2002/0006018 A1 | 1/2002 | Narumi et al. .............. 360/126 |
| 2003/0151858 A1 * | 8/2003 | Hsiao et al. ................. 360/323 |
| 2003/0153103 A1 * | 8/2003 | Perry ........................... 438/10 |
| 2003/0165034 A1 * | 9/2003 | Nikitin et al. .............. 360/322 |

OTHER PUBLICATIONS

U.S. patent application Ser. No. 09/649,985, Shukh et al., filed Aug. 29, 2000.
U.S. patent application Ser. No. 09/664,270, Shukh et al., filed Sep. 18, 2000.

(List continued on next page.)

Primary Examiner—Julie Anne Watko
(74) Attorney, Agent, or Firm—Kinney & Lange, P.A.

(57) ABSTRACT

A transducing head formed upon a slider has a transducer, an electrical contact layer, a stud electrically connected to the contact layer, and a bond pad electrically connected to the stud. The electrical contact layer is electrically connected to the transducer. The stud is formed of a material having a coefficient of thermal expansion less than about 1.3 times a coefficient of thermal expansion of a slider material forming the slider. The bond pad has a metallic underlayer and a top layer. The metallic underlayer is formed of a material having a coefficient of thermal expansion less than about 1.1 times the coefficient of thermal expansion of the slider material.

24 Claims, 6 Drawing Sheets

OTHER PUBLICATIONS

U.S. patent application Ser. No. 09/605,080, Shukh, filed Jun. 26, 2000.

R.M. Bozorth, "Ferromagnetism", AT&T (Princeton, NJ: D Van Norstrand, 1978) pp. 165–166.

H. Masumoto, 'On the Thermal Expansion of the Alloys of Iron, Nickel, and cobalt and the Cause of the Small Expansibility of Alloys of the Invar Type', *Science Reports of the Tohoku Imperial University*, vol. XX, 1931.

* cited by examiner

TRANSDUCING HEAD HAVING IMPROVED STUDS AND BOND PADS TO REDUCE THERMAL DEFORMATION

CROSS-REFERENCE TO RELATED APPLICATION(S)

This application claims the priority from provisional U.S. patent application 60/345,833, filed on Jan. 4, 2002 for "Reduction of Thermal Deformation of Heads Caused by Studs and Electrical Bond Pads" of Ladislav Rudolf Pust, Declan Macken, Tracy C. Baresh, Ibro Tabakovic, and Venkateswara R. Inturi, which application is hereby incorporated by reference in its entirety.

BACKGROUND OF THE INVENTION

The present invention relates generally to the field of magnetic data storage and retrieval systems. In particular, the present invention relates to a thin film transducing head having its studs and electrical bond pads formed of a material selected to reduce thermal deformation.

In a magnetic data storage and retrieval system, a thin film transducing head typically includes a transducer and a substrate upon which the transducer is built. The transducer, which typically includes a writer portion for storing magnetically-encoded information on a magnetic media and a reader portion for retrieving that magnetically-encoded information from the magnetic media, is formed of multiple layers successively stacked upon the substrate. The volume of the transducer is typically much smaller than the volume of the substrate.

The layers of the transducer, which include both metallic and insulating layers, all have differing mechanical and chemical properties than the substrate. These differences in properties affect several aspects of the transducer. First, the layers of the transducing head will be lapped at different rates. Thus, when an air bearing surface (ABS) of the transducing head is lapped during its fabrication, differing amounts of the layers will be removed—resulting in the transducing head having a uneven ABS. Commonly, a greater amount of the metallic layers of the transducer will be removed during the lapping process than will be removed from the substrate. Thus, this lapping process results in a Pole Tip Recession (PTR) of the metallic layers of the transducer with respect to the substrate. The PTR of a particular layer is defined as the distance between the air bearing surface of the substrate and the air bearing surface of that layer.

The differing mechanical and chemical properties of the substrate and transducer layers further affect the air bearing surface during operation of the transducing head. As the magnetic data storage and retrieval system is operated, the transducing head is subjected to increasing temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) of materials used in forming the substrate is typically much smaller than the CTE of materials used in forming the metallic layers of the transducer. Due to the larger CTE of the transducer's metallic layers, those layers will tend to expand a greater amount than will the substrate. Thus, when the transducing head is subjected to higher operating temperatures, the metallic layers tend to protrude closer to the magnetic disc than the substrate; thereby affecting the PTR of the transducer. This thermal protrusion of the metallic layers, or change in PTR caused by temperature, is referred to as Thermal PTR (T-PTR).

During operation of the magnetic data storage and retrieval system, the transducing head is positioned in close proximity to the magnetic media. A distance between the transducer and the media is preferably small enough to allow for writing to and reading from a magnetic medium having a large a real density, and great enough to prevent contact between the magnetic media and the transducer. Performance of the transducer depends primarily on this distance.

Although T-PTR is largely driven by the large CTE of the metallic layers of the transducer, other large metallic components of the transducing head have a significant impact on T-PTR. Such large metallic components include a plurality of electrical bond pads that function to provide current to the transducer and a plurality of studs that function to provide electrical connection between the individual layers of the transducer and the electrical bond pads. Traditionally, the electrical bond pads are formed of either gold or a bilayer of gold and permalloy. Gold is commonly used for the bond pads because it ensures good electrical contact with external current sources. The studs are conventionally formed of copper for its ease of fabrication. Gold, copper, and permalloy each have a CTE substantially greater than the CTE of materials typically used to form the substrate. Thus, at higher operating temperatures, the bond pads and studs tend to expand more than the substrate. And, as transducing heads have become smaller, the studs and bond pads have been moved closer to the transducer, and have begun having a more pronounced effect on T-PTR.

BRIEF SUMMARY OF THE INVENTION

A transducing head formed upon a slider has a transducer, an electrical contact layer, a stud electrically connected to the contact layer, and a bond pad electrically connected to the stud. The electrical contact layer is electrically connected to the transducer. The stud is formed of a material having a coefficient of thermal expansion less than about 1.3 times a coefficient of thermal expansion of a slider material forming the slider. The bond pad has a metallic underlayer and a top layer. The metallic underlayer is formed of a material having a coefficient of thermal expansion less than about 1.1 times the coefficient of thermal expansion of the slider material.

DETAILED DESCRIPTION

Figure 1:
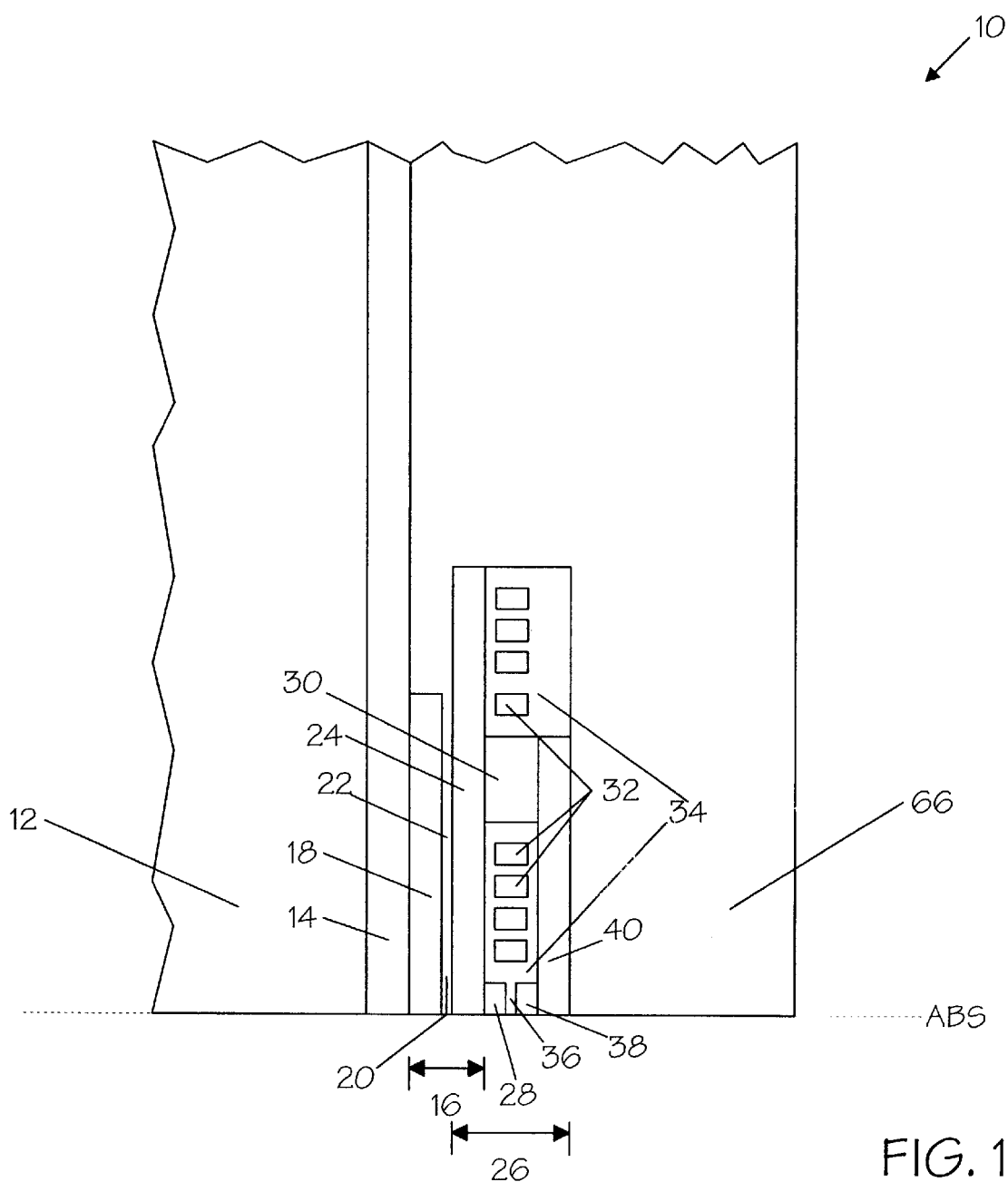
FIGS. 1, 2, and 3 are partial cross-sectional views of a transducing head in accord with the present invention.
Figure 2:
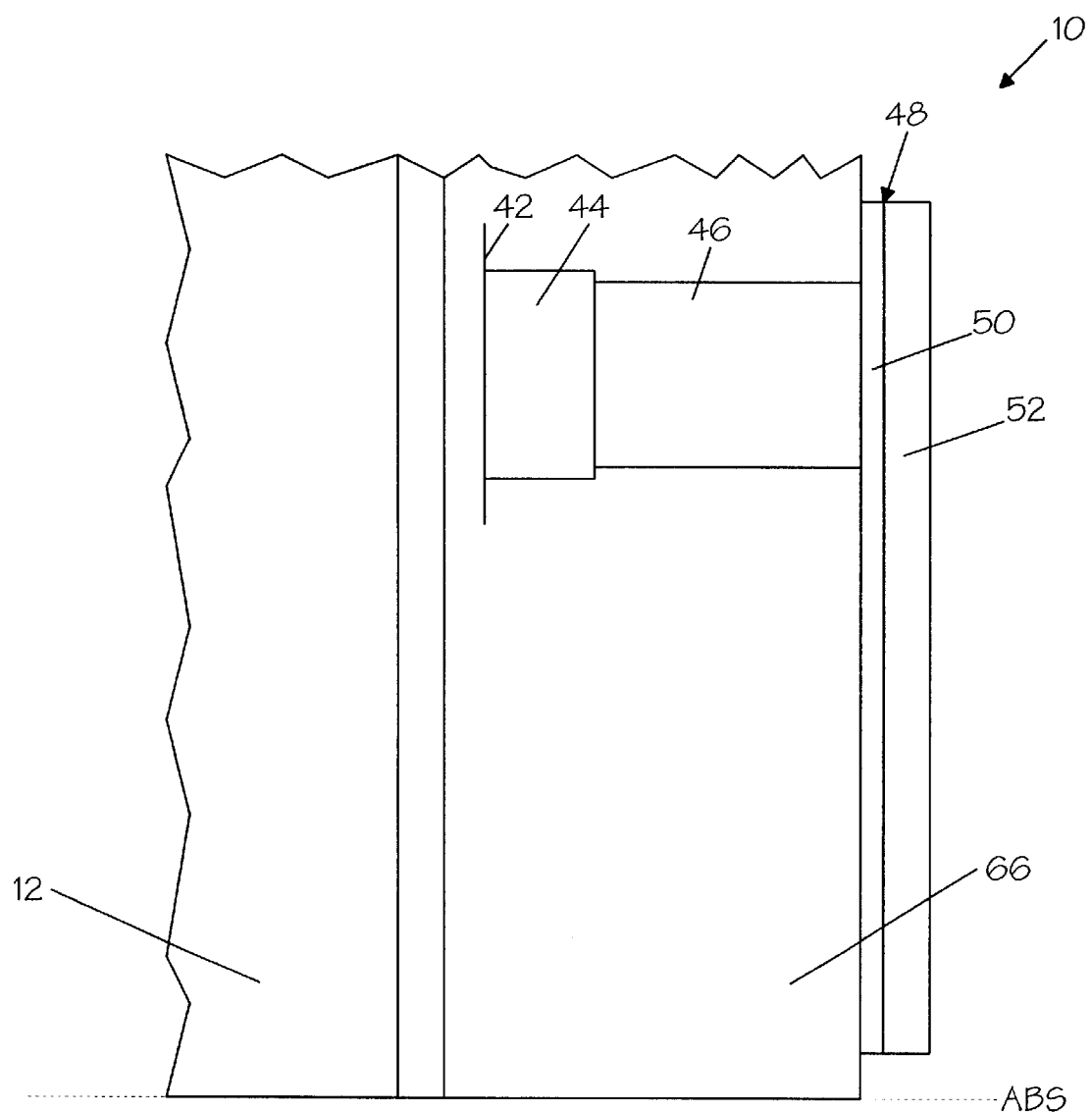
Figure 3:
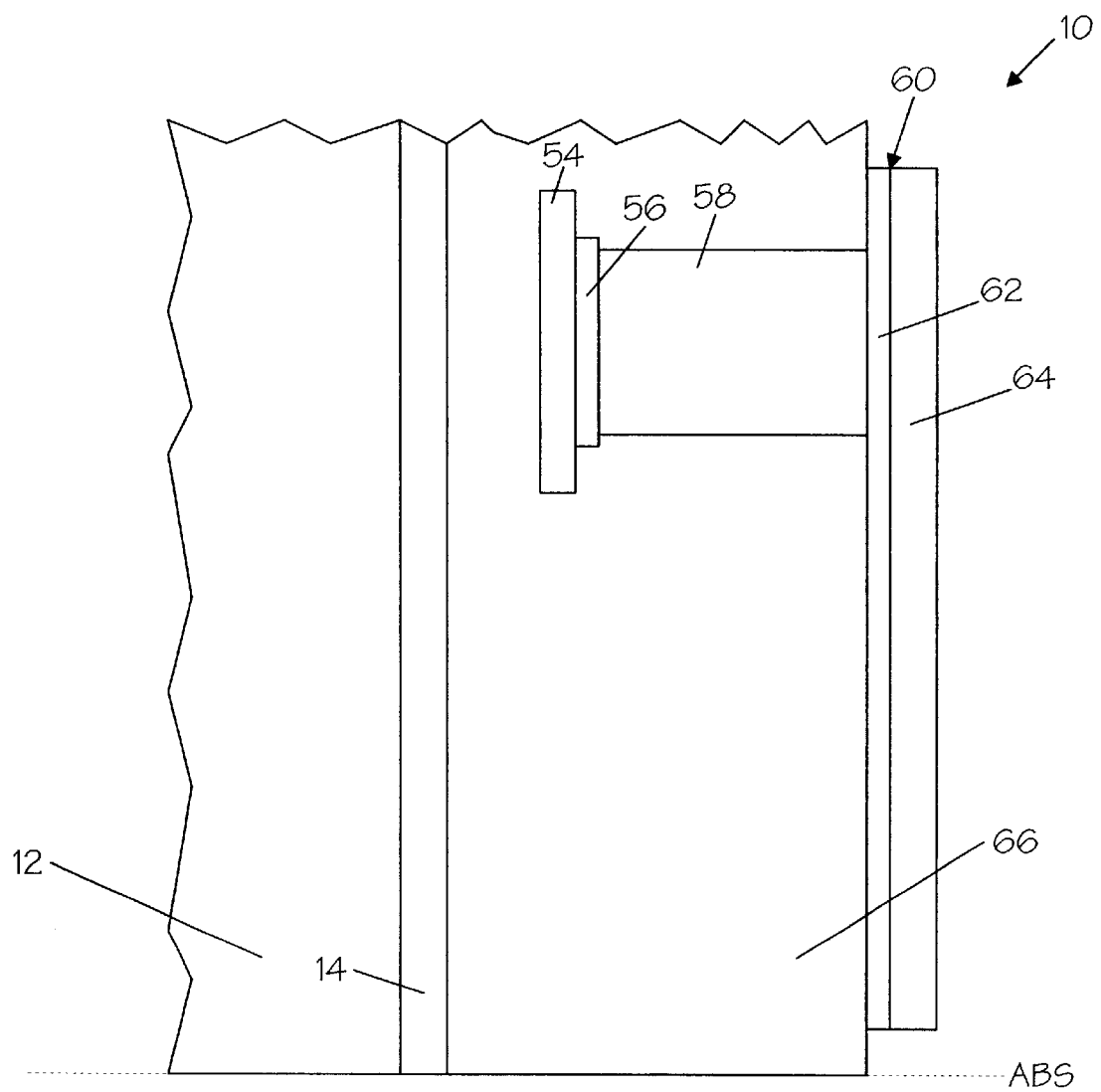
Figure 4A:
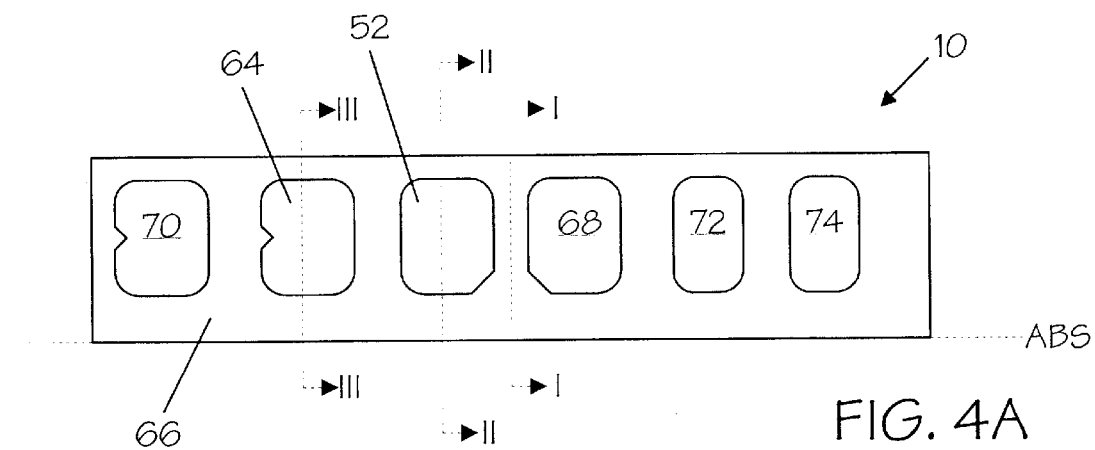
FIG. 4A is a top view of a the transducing head of FIGS. 1, 2, and 3.

FIGS. 1, 2, and 3 are partial cross-sectional views of transducing head 10 in accord with the present invention. The cross-sections of FIGS. 1, 2, and 3 are each taken substantially normal to an air bearing surface (ABS) of transducing head 10. FIG. 4A is a top view of transducing head 10. In FIG. 4A, the cross-section of FIG. 1 is illustrated as cross-section I—I, the cross-section of FIG. 2 is illustrated as cross-section II—II, and the cross-section of FIG. 3 is illustrated as cross-section III—III.

Transducing head 10 includes substrate 12, basecoat 14, read transducer 16 (or reader 16) (which includes bottom shield 18, read element 20, read gap 22 and shared pole 24), writer transducer 26 (or writer 26) (which includes shared pole 24, shared pole tip 28, write via 30, conductive coil 32, coil insulator 34, write gap 36, top pole tip 38, and top pole 40), reader contact 42, reader stud pedestal 44, reader stud 46, reader electrical bond pad 48 (which includes metallic underlayer 50 and top layer 52), writer contact 54, writer stud pedestal 56, writer stud 58, writer electrical bond pad 60 (which includes metallic underlayer 62 and top layer 64), and overcoat 66.

Basecoat 14 is deposited on substrate 12. Reader 16 and writer 26 are each multi-layer devices which are stacked upon basecoat 14 adjacent the ABS of transducing head 10. As shown in FIG. 1, reader 16 is formed on basecoat 14, and writer 26 is both stacked on and merged with reader 16. In other embodiments not illustrated, reader 16 and writer 26 may be arranged in a piggyback configuration (in which layers are not shared between the two elements) and/or writer 26 may be formed on basecoat 14 (with reader 16 being formed on writer 26). Additionally, transducing head may be formed with only reader 16 or writer 26. As seen in FIG. 2, opposite the ABS in a plane of read element 20 is reader contact 42, which is electrically connected to one end of read element 20 (this connection is not illustrated in FIGS. 1 and 2). Successively stacked upon reader contact 42 are reader stud pedestal 44 and reader stud 46. As seen in FIG. 3, also opposite the ABS in a plane of conductive coil 32 is writer contact 54, which is electrically connected to one end of conductive coil 32 (this connection is not illustrated in FIGS. 1 and 3). Successively stacked upon writer contact 54 are writer stud pedestal 56 and writer stud 58. Overcoat 66 is formed on writer 45 and envelops reader contact 42, reader stud pedestal 44, reader stud 46, writer contact 54, writer stud pedestal 56 and writer stud 58. Reader bond pad 48 is formed in electrical connection with reader stud 46 on overcoat 66. Similarly, writerbond pad 60 is formed in electrical connection with writer stud 58 on overcoat 66.

Figure 4B:
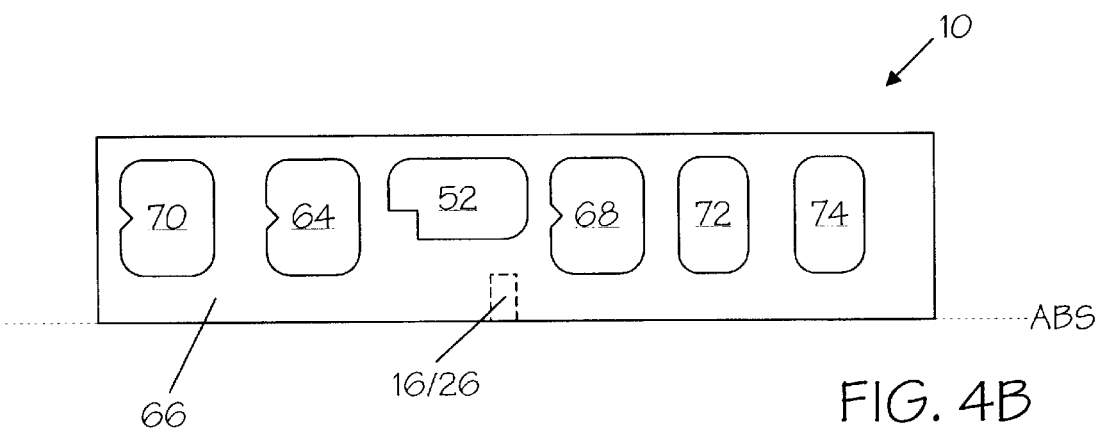
FIG. 4B is a top view of an alternative embodiment of the transducing head of FIGS. 1, 2, and 3.

FIG. 4A is a top view of a transducing head 10 illustrating one possible configuration of a top surface of transducing head. In this embodiment, top layer 52 of reader bond pad 48 and top layer 64 of writer bond pad 60 are positioned within overcoat 66 along with additional bond pads not shown in FIGS. 1 and 2. Also positioned within overcoat 66 are top layer 68 of a second writer bond pad, top layer 70 of a second writer bond pad, top layer 72 of a first auxiliary bond pad, and top layer 74 of a second auxiliary bond pad. Reader bond pad 48 and the second reader bond pad function together to provide current to reader 16, while writer bond pad 64 and the second writer bond pad function together to provide current to writer 26. The auxiliary bond pads may be used for any of a plurality of applications, including monitoring a lapping of the ABS during fabrication and fly height control. FIG. 4B illustrates a second possible configuration of top layer 52 of reader bond pad 48, top layer 64 of writer bond pad 60, top layer 68 of the second reader bond pad, top layer 70 of the second writer bond pad, top layer 72 of the first auxiliary bond pad, and top layer 74 of the second auxiliary bond pad. In the embodiment illustrated in FIG. 4B, reader 16 and writer 26 are located adjacent the ABS beneath reader bond pad 48.

Substrate 12 is typically formed of an electrically-conductive, ceramic material such as AlTiC, which has a coefficient of thermal expansion (CTE) typically in the range of about $6.5 \times 10^{-6}/^\circ$ C. to about $8.3 \times 10^{-6}/^\circ$ C.

Insulating basecoat 14 is formed on substrate 12. Basecoat 14 is generally formed of an insulating material, such as $Al_2O_3$. Generally, the insulating material for basecoat 14 is selected to most closely match the chemical and mechanical properties of the material used as substrate 12. For example, an $Al_2O_3$ basecoat 14 is commonly used in conjunction with an AlTiC substrate 12, since the two materials have similar CTEs.

Reader 16 is formed on basecoat 14, and includes bottom shield 18, read element 20, read gap 22, and shared pole 24. Reader 16 may be any of a variety of different types of read transducers, including current-in-plane (CIP) read transducers and current-perpendicular-to-plane (CPP) read transducers. Read element 20 is positioned in read gap 22 adjacent the ABS between bottom shield 18 and shared pole 24. In both CIP and CPP transducers, bottom shield 18 and shared pole 24 function to prevent read element 20 from receiving stray magnetic fields, and read gap 22 functions to magnetically insulate read element 20 from bottom shield 18 and shared pole 24. However, in a CPP transducer, bottom shield 18 and shared pole 24 also function as current contacts for providing a sense current to read element 20, and in a CIP transducer, read gap 22 also functions to electrically insulate read element 20 from bottom shield 18 and shared pole 24. Read element 20 may be any of a variety of different types of read elements, such as an anisotropic magnetoresistive (MR) read element or a giant magnetoresistive (GMR) read element. In operation, magnetic flux from a surface of a magnetic media causes rotation of a magnetization vector of a sensing layer of read element 20, which in turn causes a change in electrical resistivity of read element 20. The change in resistivity of read element 20 can be detected by passing a current through read element 20 and measuring a voltage across read element 20.

Writer 26 is formed on reader 16, and includes shared pole 24, shared pole tip 28, write via 30, conductive coil 32, coil insulator 34, write gap 36, top pole tip 38, and top pole 40. Shared pole tip 28 and write via 30 are formed on shared pole 24, with shared pole tip 28 being positioned adjacent the ABS and write via 30 being spaced away from the ABS. Write gap 36 is defined on the ABS between shared pole tip 28 and top pole tip 38. Top pole 40 connects top pole tip 38 at the ABS to write via 30. Conductive coil 32 is positioned in coil insulator 34 at least in part between shared pole 24 and top pole 40, wrapping around write via 30, such that a flow of electrical current through conductive coil 32 generates a magnetic field across write gap 36.

Reader contact 42 electrically connects to one end of read element 20, while a second reader contact (not illustrated) electrically connects to a second end of read element 20, to provide current through read element 20. Similarly, writer contact 54 electrically connects to one end of conductive coil 32, while a second writer contact (not illustrated) electrically connects to a second end of conductive coil 32, to provide current through conductive coil 32. Reader stud pedestal 44 and writer stud pedestal 56 serve to elevate a respective one of reader stud 46 and writer stud 58 to a substantially similarly height. Reader stud 46 functions to provide electrical connectivity between reader bond pad 48 and reader contact 42, while writer stud 58 functions to provide electrical connectivity between writer bond pad 60 and writer contact 54.

Each of bottom shield 18, shared pole 24, shared pole tip 28, top pole tip 38, and top pole 40 are formed of metallic materials. Preferably, each of these components is formed of an alloy primarily composed of Fe, Ni and Co. Such metallic alloys typically have large CTEs. For example, $Ni_{79}Fe_{21}$ has a CTE of about $12.7 \times 10^{-6}/°$ C.

Read gap 22 and overcoat 66 are each generally formed of an insulating material, such as $Al_2O_3$. Coil 32, reader contact 42, reader stud pedestal 44, writer contact 54, and writer stud pedestal 54 are each typically formed of an electrically-conductive metal such as copper, gold or silver. Most commonly used is copper, which has a CTE of about $16.5 \times 10^{-6}/°$ C. Coil insulator 34 is generally formed from a cured photoresist having a large CTE, or from other insulating materials, such as AlN, $Al_2O_3$, or $SiO_2$. Write gap 36 is generally formed of a non-magnetic material such as $Al_2O_3$.

Studs 46 and 58 of the present invention are formed of a low CTE material. Reader bond pad 48 of the present invention is a multilayer having underlayer 50 formed of a low CTE material and top layer 52 formed of a highly conductive material. Similarly, writer bond pad 60 of the present invention is a multilayer having underlayer 62 formed of a low CTE material and top layer 64 formed of a highly conductive material. The low CTE materials forming studs 46 and 58 preferably have a CTE less than about 1.3 times the CTE of the material forming substrate 12, while the low CTE materials forming underlayers 50 and 62 preferably have a CTE less than about 1.1 times the CTE of the material forming substrate 12. Most preferably, the low CTE material forming underlayers 50 and 62 is less than the CTE of the material forming substrate 12. Suitable materials for studs 46 and 58 and underlayers 50 and 62 include but are not limited to $Ni_XFe_{100-X}$, where X is in a range of about 30 percent to about 50 percent; a NiFeCoCr alloy having a CTE less than about $9 \times 10^{-6}/°$ C. A thickness of studs 46 and 58 is preferably in a range of about 20 micrometers to about 40 micrometers, while a thickness of underlayers 50 and 62 is preferably in a range of about 1 micrometer to about 30 micrometers.

The layers of transducing head 10 all have differing mechanical and chemical properties. Due to these differing properties, the layers of transducing head 10 will be lapped at different rates. Thus, the lapping of the ABS of transducing head 10 during fabrication results in transducing head 10 having a uneven ABS. Commonly, a greater amount of the metallic layers of transducing head 10 will be removed during the lapping process than will be removed from substrate 12, resulting in a Pole Tip Recession (PTR) of the metallic layers with respect to substrate 12. The PTR of a particular layer is defined as the distance between the air bearing surface of substrate 12 and the air bearing surface of that layer.

The differing mechanical and chemical properties of the layers of transducing head 10 further affect the air bearing surface of transducing head 10 during operation thereof. The coefficient of thermal expansion (CTE) of materials used in forming substrate 12 is typically much smaller than the CTE of materials used in forming the metallic layers of transducing head 10. Due to the larger CTE of the metallic layers, those layers will tend to expand a greater amount than will substrate 12. Thus, when transducing head 10 is subjected to higher operating temperatures, the metallic layers tend to protrude closer to the magnetic disc than substrate 12; thereby affecting the PTR of the metallic layers of transducing head 10. This thermal protrusion of the metallic layers, or change in PTR caused by temperature, is referred to as Thermal PTR (T-PTR).

Although T-PTR is largely driven by the large CTE of the metallic layers of transducing head 10, other large metallic components of transducing head 10, such as studs 46 and 58 and bond pads 48 and 60, may significantly affect a thermal protrusion of the metallic layers of transducing head 10. In prior art designs, studs 46 and 58 were conventionally formed of copper for its ease of fabrication, while bond pads 48 and 60 were formed of either gold or a bilayer of gold and permalloy. Gold, copper, and permalloy each have a CTE substantially greater than the CTE of materials typically used to form substrate 12. Thus, at higher operating temperatures, prior art studs 46 and 58 and bond pads 48 and 60 will expand more than substrate 12. The impact of this greater expansion is more pronounced in newer transducing heads, which tend to be smaller than prior art designs, and which locate studs 46 and 58 and bond pads 48 and 60 closer to reader 16 and writer 26 than prior art designs. Thus, thermal expansion of studs 46 and 58 and bond pads 48 and 60 in prior art transducing heads have a significant impact on T-PTR of reader 16 and writer 26.

The present invention addresses the problem of T-PTR related to studs 46 and 58 and bond pads 48 and 60 by using lower CTE materials for studs 46 and 58 and by using a multilayer structure for bond pads 48 and 60. Bond pads 48 is formed of underlayer 50 and top layer 52, and bond pad 58 is formed of underlayer 62 and top layer 64. Studs 46 and 58 are preferably formed of a material having a CTE no greater than 1.3 times the CTE of the material forming substrate 12. Underlayers 50 and 62 of bond pads 48 and 60 are each preferably formed of a material having a CTE no greater than 1.1 times the CTE of the material forming substrate 12. Preferably, each of top layers 52 and 64 is formed of a material readily solderable or bondable in an ultrasonic ball bonding process or comparable bonding process. Additionally, the material forming top layer 52 and 64 preferably is at least as electrically conductive as the least conductive material used in forming contacts 42 and 54, stud pedestals 44 and 56, studs 46 and 58, and underlayers 50 and 62. Low CTE underlayers 50 and 62 of respective bond pads 48 and 60 compensate for the relatively high CTE of top layers 52 and 64.

Figure 5:
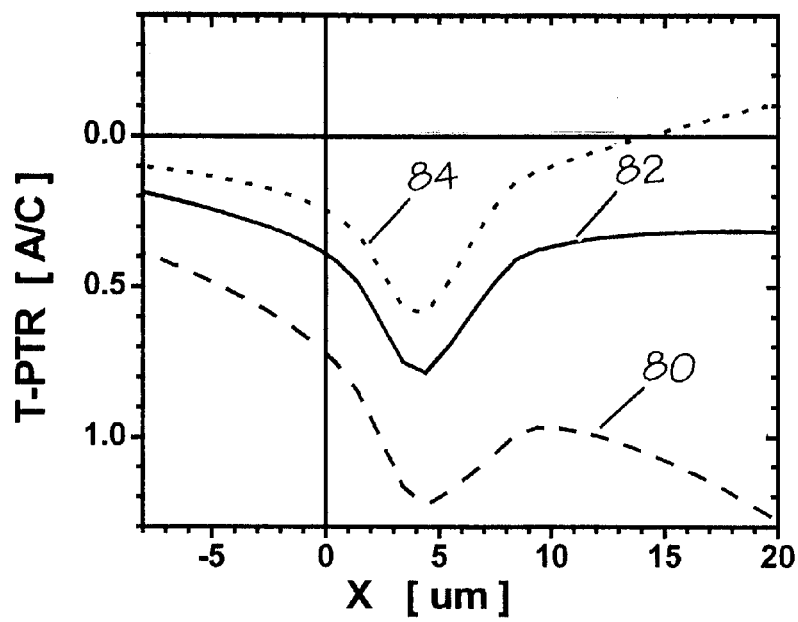
FIG. 5 is a graph comparing thermal pole tip recession in transducing heads having their bond pad underlayers formed of differing materials.

FIG. 5 is a graph comparing thermal pole tip protrusion in transducing heads having their bond pad underlayers formed of differing materials. Each transducing head is built upon a substrate, has copper studs, and is a identical except for the material forming an underlayer of a bond pad of the transducing head. The horizontal axis in the graph represents location X along the ABS of the transducing head, with location X less than zero being located along the substrate, location X greater than zero being located along the transducing head, and location X=4 μm, for which maximum thermal pole tip protrusion exists, being located adjacent shields of the transducing head. Curve 80 illustrates thermal pole tip protrusion in a transducing head having its bond pad formed of a multilayer of $Ni_{80}Fe_{20}$ and gold. Curve 82 illustrates thermal pole tip protrusion in a transducing head having its bond pad formed of a multilayer of $Ni_{45}Fe_{55}$ and gold. Finally, curve 84 illustrates thermal pole tip protrusion in a transducing head having its bond pad formed of a multilayer of $Ni_{35}Fe_{65}$ and gold. As is evident from FIG. 5, forming bond pad underlayers of a transducing head from a lower CTE material has a significant impact on thermal pole tip protrusion.

Figure 6:
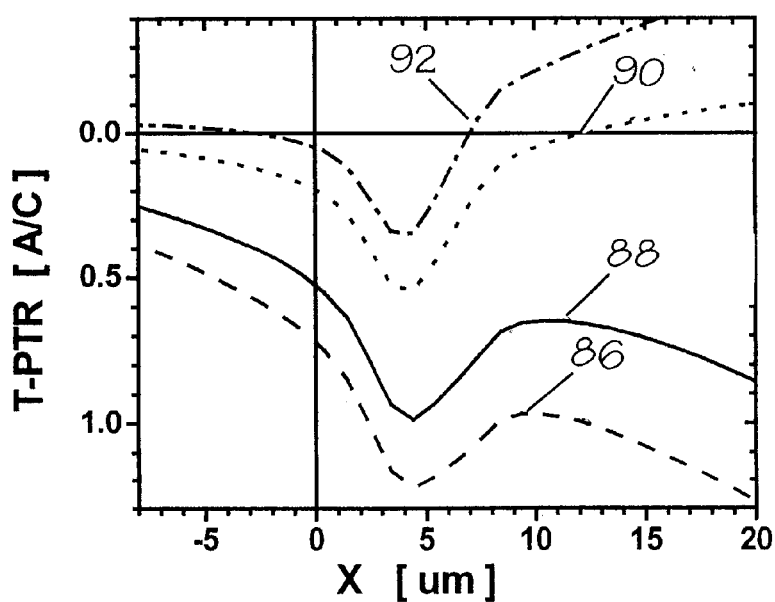
FIG. 6 is a graph comparing thermal pole tip recession in transducing heads having their studs and bond pad underlayers formed of differing materials.

FIG. 6 is a graph comparing thermal pole tip protrusion in transducing heads having their studs and bond pad underlayers formed of differing materials. Again, each transducing head is built upon a substrate, and is identical except for the materials forming a stud and an underlayer of a bond pad of the transducing head. The horizontal axis in the graph represents location X along the ABS of the transducing head, with location X less than zero being located along the substrate, location X greater than zero being located along the transducing head, and location X=4 µm, for which maximum thermal pole tip protrusion exists, being located adjacent shields of the transducing head. Curve 86 illustrates thermal pole tip protrusion in a transducing head having its stud formed of copper and its bond pad formed of a multilayer of $Ni_{80}Fe_{20}$ and gold. Curve 88 illustrates thermal pole tip protrusion in a transducing head having its stud formed of $Ni_{45}Fe_{55}$ and its bond pad formed of a multilayer of $Ni_{80}Fe_{20}$ and gold. Curve 90 illustrates thermal pole tip protrusion in a transducing head having its stud formed of $Ni_{45}Fe_{55}$ and its bond pad formed of a multilayer of $N_{45}Fe_{55}$ and gold. Finally, curve 92 illustrates thermal pole tip protrusion in a transducing head having its stud formed of $Ni_{45}Fe_{55}$ and its bond pad formed of a multilayer of $Ni_{35}Fe_{65}$ and gold. As is evident from FIG. 6, forming both studs and bond pad underlayers of a transducing head from a lower CTE material has a significant impact on thermal pole tip protrusion.

Figure 7:
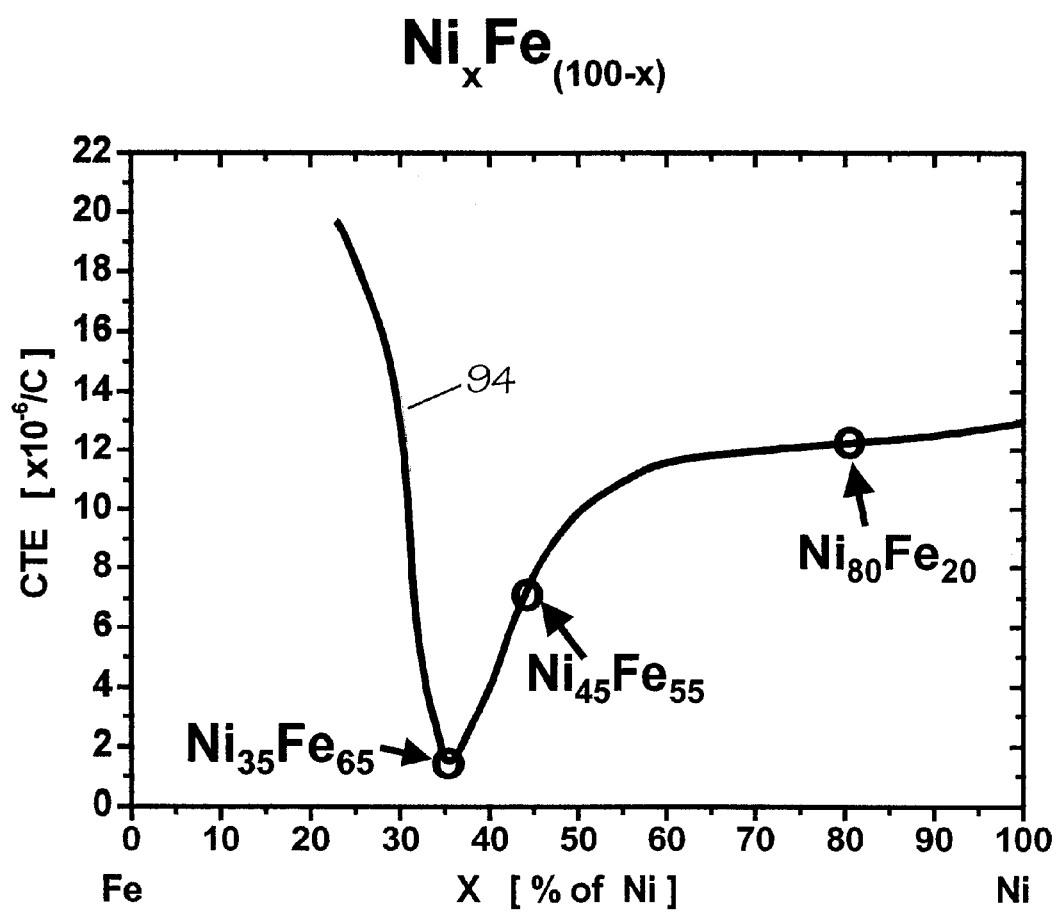
FIG. 7 is a graph illustrating CTEs of various NiFe alloys.

FIG. 7 is a graph illustrating CTEs of various NiFe alloys. Curve 94 plots the CTE along the vertical axis of various $Ni_XFe_{100-X}$ alloys, wherein X, which is plotted along the horizontal axis, represents percentage X of Ni in the $Ni_XFe_{100-X}$ alloy. Highlighted in FIG. 7 are $Ni_{80}Fe_{20}$ (similar to Permalloy), $Ni_{45}Fe_{55}$, and $Ni_{35}Fe_{65}$ (Invar). As is evident, permalloy has a CTE significantly greater than $Ni_{45}Fe_{55}$, and even greater than Invar. $Ni_{45}Fe_{55}$ has a CTE substantially similar to AlTiC, which is commonly used to form substrates upon which transducing heads are built. Finally, Invar has a CTE significantly less than AlTiC.

In conclusion, the present invention minimizes the problem of thermal pole tip protrusion related to a plurality of studs and bond pads located on a transducing head. Forming the studs of a relatively low CTE material, and the bond pads of a multilayer structure of a relatively low CTE material and a highly conductive material, allows for a transducing head having reduced thermal pole tip protrusion.

Although the present invention has been described with reference to preferred embodiments, workers skilled in the art will recognize that changes may be made in form and detail without departing from the spirit and scope of the invention.

What is claimed is:

1. A transducing head formed upon a slider, the transducing head comprising:
   a transducer;
   an electrical contact layer electrically connected to the transducer;
   a stud electrically connected to the contact layer, the stud being formed of a stud material having a coefficient of thermal expansion less than about 1.3 times a coefficient of thermal expansion of a slider material forming the slider; and
   a bond pad formed electrically connected to the stud, the bond pad comprising a metallic underlayer and a top layer, the metallic underlayer being formed of a underlayer material having a coefficient of thermal expansion less than about 1.1 times the coefficient of thermal expansion of the slider material.

2. The transducing head of claim 1 wherein the stud material is $Ni_XFe_{100-X}$, wherein X is in a range of about 30 percent to about 50 percent.

3. The transducing head of claim 1 wherein the stud material is a NiFeCoCr alloy having a coefficient of thermal expansion less than about $9 \times 10^{-6}/° C$.

4. The transducing head of claim 1 wherein a thickness of the stud is in a range of about 20 micrometers to about 40 micrometers.

5. The transducing head of claim 1 wherein the coefficient of thermal expansion of the underlayer material is less than the coefficient of thermal expansion of the slider material.

6. The transducing head of claim 1 wherein the underlayer material is $Ni_XFe_{100-X}$, wherein X is in a range of about 30 percent to about 50 percent.

7. The transducing head of claim 1 wherein the underlayer material is a NiFeCoCr alloy having a coefficient of thermal expansion less than about $9 \times 10^{-6}/° C$.

8. The transducing head of claim 1 wherein the underlayer has a thickness in a range of about 1 micrometers to about 30 micrometers.

9. In a transducing head formed on a slider, the transducing head comprising:
   a transducer;
   an electrical contact layer electrically connected to the transducer;
   a stud electrically connected to the contact layer; and
   a bond pad formed electrically connected to the stud;
   an improvement comprising:
   the stud being formed of a stud material having a coefficient of thermal expansion less than about 1.3 times a coefficient of thermal expansion of a slider material forming the slider; and
   the bond pad comprising a metallic underlayer and a top layer, the metallic underlayer being formed of a underlayer material having a coefficient of thermal expansion less than about 1.1 times the coefficient of thermal expansion of the slider material.

10. The transducing head of claim 9 wherein the stud material is $Ni_XFe_{100-X}$, wherein X is in a range of about 30 percent to about 50 percent.

11. The transducing head of claim 9 wherein the stud material is a NiFeCoCr alloy having a coefficient of thermal expansion less than about $9 \times 10^{-6}/° C$.

12. The transducing head of claim 9 wherein a thickness of the stud is in a range of about 20 micrometers to about 40 micrometers.

13. The transducing head of claim 9 wherein the coefficient of thermal expansion of the underlayer material is less than the coefficient of thermal expansion of the slider material.

14. The transducing head of claim 9 wherein the underlayer material is $Ni_XFe_{100-X}$, wherein X is in a range of about 30 percent to about 50 percent.

15. The transducing head of claim 9 wherein the underlayer material is a NiFeCoCr alloy having a coefficient of thermal expansion less than about $9 \times 10^{-6}/° C$.

16. The transducing head of claim 9 wherein the underlayer has a thickness in a range of about 1 micrometers to about 30 micrometers.

17. A transducing head mounted upon a slider, the transducing head comprising:
   a write transducer comprising a magnetic core and a conductive coil that wraps around at least a portion of the magnetic core;
   a read transducer comprising a first shield, a second shield, and a read element positioned between the first and the second shield;

a first and a second contact electrically connected across the conductive coil of the write transducer;

a third and a fourth contact electrically connected across the read element of the read transducer;

a first, a second, a third, and a fourth stud electrically connected to a respective one of the first, the second, the third, and the fourth contacts each stud being formed of a material having a coefficient of thermal expansion less than about 1.3 times a coefficient of thermal expansion of a slider material forming the slider; and a first, a second, a third, and a fourth bond pad electrically connected to a respective one of the first, the second, the third, and the fourth stud, each bond pad comprising a metallic underlayer and a top layer, the metallic underlayer being formed of a material having a coefficient of thermal expansion less than about 1.1 times the coefficient of thermal expansion of the slider material.

18. The transducing head of claim 17 wherein each stud is formed of $Ni_XFe_{100-X}$, wherein X is in a range of about 30 percent to about 50 percent.

19. The transducing head of claim 17 wherein each stud is formed of a NiFeCoCr alloy having a coefficient of thermal expansion less than about $9 \times 10^{-6}/°$ C.

20. The transducing head of claim 17 wherein a thickness of each stud is in a range of about 20 micrometers to about 40 micrometers.

21. The transducing head of claim 17 wherein the coefficient of thermal expansion of the material forming the underlayer of each bond pad is less than the coefficient of thermal expansion of the slider material.

22. The transducing head of claim 17 wherein the underlayer of each bond pad is formed of $Ni_XFe_{100-X}$, wherein X is in a range of about 30 percent to about 50 percent.

23. The transducing head of claim 17 wherein the underlayer of each bond pad is formed of a NiFeCoCr alloy having a coefficient of thermal expansion less than about $9 \times 10_{-6}/°$ C.

24. The transducing head of claim 17 wherein a thickness of the underlayer of each bond pad is in a range of about 1 micrometers to about 30 micrometers.

* * * * *

UNITED STATES PATENT AND TRADEMARK OFFICE
CERTIFICATE OF CORRECTION

PATENT NO. : 6,813,118 B2
DATED : November 2, 2004
INVENTOR(S) : Ladislav Rudolf Pust et al.

It is certified that error appears in the above-identified patent and that said Letters Patent is hereby corrected as shown below:

Column 10,
Line 18, delete "$9\times10_{-6}/°C$", insert -- $9\times10^{-6}/°C$ --

Signed and Sealed this

Twenty-second Day of March, 2005

JON W. DUDAS
*Director of the United States Patent and Trademark Office*